(12) United States Patent  (10) Patent No.: US 7,237,917 B2
Yamada et al.  (45) Date of Patent: Jul. 3, 2007

(54) MIRROR AND ANGLE DETECTION DEVICE

(75) Inventors: Ayako Yamada, Fujieda (JP); Hidenori Sato, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 0 days.

(21) Appl. No.: 11/235,193

(22) Filed: Sep. 27, 2005

(65) Prior Publication Data

US 2006/0066967 A1  Mar. 30, 2006

(30) Foreign Application Priority Data

Sep. 29, 2004  (JP)  ............................. 2004-283779

(51) Int. Cl.
  *G02B 5/08*  (2006.01)
  *G02B 7/182*  (2006.01)
  *B60R 1/06*  (2006.01)
(52) U.S. Cl. ...................... 359/873; 359/874; 359/877
(58) Field of Classification Search ................ 359/873, 359/874, 876, 877
  See application file for complete search history.

(56) References Cited

U.S. PATENT DOCUMENTS

| 4,670,679 | A |   | 6/1987  | Koot et al.  |         |
|-----------|---|---|---------|--------------|---------|
| 4,678,295 | A | * | 7/1987  | Fisher       | 359/874 |
| 4,770,522 | A | * | 9/1988  | Alten        | 359/873 |
| 4,818,090 | A | * | 4/1989  | Righi        | 359/874 |
| 4,856,885 | A | * | 8/1989  | Fimeri       | 359/874 |
| 4,915,493 | A | * | 4/1990  | Fisher et al.| 359/874 |
| 5,042,932 | A | * | 8/1991  | Pent         | 359/874 |
| 5,838,507 | A | * | 11/1998 | Boddy et al. | 359/877 |
| 5,993,018 | A |   | 11/1999 | Hattori et al.|        |
| 6,000,805 | A | * | 12/1999 | Inagaki      | 359/871 |

(Continued)

FOREIGN PATENT DOCUMENTS

DE  39 14 334 A1  10/1990

(Continued)

OTHER PUBLICATIONS

U.S. Appl. No. 11/194,538, filed Aug. 2, 2005, Yamada.
U.S. Appl. No. 11/195,761, filed Aug. 3, 2005, Yamada et al.

*Primary Examiner*—Ricky D. Shafer
(74) *Attorney, Agent, or Firm*—Oblon, Spivak, McClelland, Maier & Neustadt, P.C.

(57) ABSTRACT

A vehicle mirror comprises a mirror surface; a plate pivot 110 which tilts the mirror surface by tilting the plate pivot itself,
a housing 120 which covers the plate pivot facing to the rear surface of the mirror surface across the plate pivot, which possesses a bottom portion substantially parallel to the plate pivot, and a curved side wall which is brought into contact with the side surface of the plate pivot to guide the side surface; an adjust nut 108 which is provided between the housing and the plate pivot, and which moves toward or backward to the rear surface of the pivot to tilt the plate pivot; a rotational variable resistor 118 which is provided between the housing and the plate pivot, and whose resistance value is varied depending on the rotation amount of a rotor that rotates depending upon the movement of the adjust nut; and a signal outputting portion 124, which outputs a signal corresponding to the titled angle of the mirror surface depending upon the resistance of the rotational variable resistor.

3 Claims, 5 Drawing Sheets

U.S. PATENT DOCUMENTS

| | | | |
|---|---|---|---|
| 6,254,242 B1 * | 7/2001 | Henion et al. | 359/872 |
| 6,652,108 B1 | 11/2003 | Schillegger | |
| 2004/0047054 A1 * | 3/2004 | Kikuchi | 359/877 |
| 2005/0225886 A1 * | 10/2005 | Yamada | 359/877 |
| 2006/0066966 A1 * | 3/2006 | Yamada et al. | 359/872 |
| 2006/0066968 A1 * | 3/2006 | Yamada | 359/877 |

FOREIGN PATENT DOCUMENTS

| | | | |
|---|---|---|---|
| EP | 0 895 898 A2 | | 2/1999 |
| GB | 2207508 | * | 2/1989 |
| JP | 10-67281 | * | 3/1998 |
| JP | 10-264726 | | 10/1998 |

* cited by examiner

MIRROR AND ANGLE DETECTION DEVICE

CROSS REFERENCE TO RELATED

The present application claims priority under 35 U.S.C. §119 of Japanese Patent Application No. 2004-283779, filed on Sep. 29, 2004, entitled "MIRROR AND ANGLE DETECTION DEVICE". The contents of that application are incorporated herein by reference in their entirety.

BACKGROUND ART

1. Field of the Invention

The present invention relates to a mirror and an angle detection device. More specifically, the present invention relates to an exterior mirror for vehicles, and an angle detection device for detecting an tilted angle of a mirror surface of the exterior mirror.

2. Description of the Related Arts

There is an exterior mirror having an angle adjusting device, which adjusts the tilted angle of the exterior mirror to obtain good rear side view. In such an exterior mirror, the tilted angle of the mirror surface can be adjusted to meet the viewing angle of the driver. However, since it is complicated to delicately readjust the tilted angle whenever the driver is changed, it is desired to reproduce the tilted angle suitable for respective driver.

Various suggestions have been made to detect the tilted angle for reproducing the tilted angle of the mirror surface. For example, an angle detection device having a resistor, slidable connect which slides the resistor according to the variation (tilting) of the mirror surface has been suggested. According to this device, since the slidable connect moves to meet the tilting of the mirror surface to change the voltage, the voltage can be detected to thereby detect the tilted angle (For Example, see Japanese Patent Laid-Open No. 10-264726, hereinafter referred to as Patent Document 1).

In the device for detecting the position of the mirror (angle detection device) disclosed in Patent Document 1, the slidable connect (connect member) slides in the thickness direction of the mirror on the resistor substrate accompanying with the movement of the adjust nut. For this reason, considering a room space alpha, when the length of the resistor on the substrate is S, and the length of the connect member is L, a space of the mirror surface in the thickness direction for providing the resistor substrate of not less than S+L+alpha should be ensured. Consequently, in many cases, in conventional, decreasing the size of the angle detection device in the thickness direction of the mirror surface can be made only with difficulty.

An object of the present invention is, therefore, to provide a mirror and an angle detection device, which can solve the problem associated with the prior art.

SUMMARY OF THE INVENTION

The present invention which can attain the object has the following configuration.

(Configuration 1)

A vehicle mirror comprises a mirror surface; a plate pivot which tilts the mirror surface by tilting the plate pivot itself, which is a plate member that can be tilted around an axis parallel to said mirror surface, and which is provided on the rear surface of the mirror surface; a housing which covers said plate pivot facing to the rear surface of the mirror surface across said plate pivot, which possesses a bottom portion substantially parallel to said plate pivot, and a curved side wall which is brought into contact with the side surface of said plate pivot to guide said side surface; a slide rod which is provided between said housing and said plate pivot, and which moves toward or backward to the rear surface of said pivot to tilt said plate pivot; a rotational variable resistor which is provided between said housing and said plate pivot, and whose resistance value is varied depending on the rotation amount of a rotor that rotates depending upon the movement of said slide rod; and a signal outputting portion, which outputs a signal corresponding to the tilted angle of the mirror surface depending upon the resistance of said rotational variable resistor. The term "rear surface of the mirror surface" intended herein a surface opposite to the reflecting surface of the mirror surface. For example, when the plate pivot does not tilt the mirror surface, the bottom portion of the housing is parallel to the plate pivot.

According this configuration, the tilted angle of the mirror surface can be suitably detected. By guiding the side surface of the plate pivot by means of the side wall of the housing, even if the mirror receives vibration, for example, during driving the vehicle at a high speed, the plate pivot can be stably tilted.

As a variable resistor for detecting the tilted angle of the mirror surface, a rotational variable resistor (rotary volume) is used and, thus, a space required in the thickness direction of the mirror surface can be decreased. This makes it possible to decrease the size of the housing. Also, when the bottom portion of the housing is substantially parallel to the plate pivot, a space can be saved.

What is more, a general rotary volume commercially available as the a rotational variable resistor can be used. For this reason, it is not necessary to customize and produce a variable resistor, decreasing the cost.

For example, if the tilted angle of the mirror surface is to be detected by a variable resistor using a slidable connects which slides in the thickness direction of the mirror surface, a space should be secured in the thickness direction of the mirror surface, leading to the enlargement of the size of the housing.

(Configuration 2)

The vehicle mirror further comprises a belt made of a flexible material which moves the movement of said slide rod, and the rotor of the rotational variable resistor rotates according to the movement of said belt. According this configuration, the rotor of the rotational variable resistor can be suitably rotated.

(Configuration 3)

The bottom portion of the housing holds at least part of the belt in the manner that the belt can be moved along said bottom portion. According to this configuration, the belt can be suitably moved.

(Configuration 4)

An angle detection device for detecting tilted angle of the mirror surface of a vehicle mirror comprises: a plate pivot which tilts the mirror surface by tilting the plate pivot itself, which is a plate member that can be tilted around an axis parallel to said mirror surface, and which is provided on the rear surface of the mirror surface; an actuator which tilts said plate pivots around said axis as a center to tilt said mirror surface; a housing which covers said plate pivot facing to the rear surface of the mirror surface across said plate pivot, which possesses a bottom portion substantially parallel to said plate pivot, and a curved side wall which is brought into contact with the side surface of said plate pivot to guide said side surface; a slide rod which is provided between said housing and said plate pivot, and which moves toward or backward to the rear surface of said pivot to tilt said plate pivot; a rotational variable resistor which is provided between said housing and said plate pivot, and whose resistance value is varied depending on the rotation amount of a rotor that rotates depending upon the movement of said slide rod; and a signal outputting portion, which outputs a signal corresponding to the tilted angle of the mirror surface depending upon the resistance of said rotational variable resistor. According to this configuration, effects similar to those of Configuration 1 can be obtained.

According to the present invention, the tilted angle of the mirror surface can be suitably detected.

BRIEF DESCRIPTION OF THE DRAWINGS

FIG. 4 is a drawing showing the rotational variable resistor 128 in detail, wherein

DESCRIPTION OF PREFERRED
EMBODIMENTS

Embodiments according to the present invention will now be described by referring to the drawings.

Figure 1:
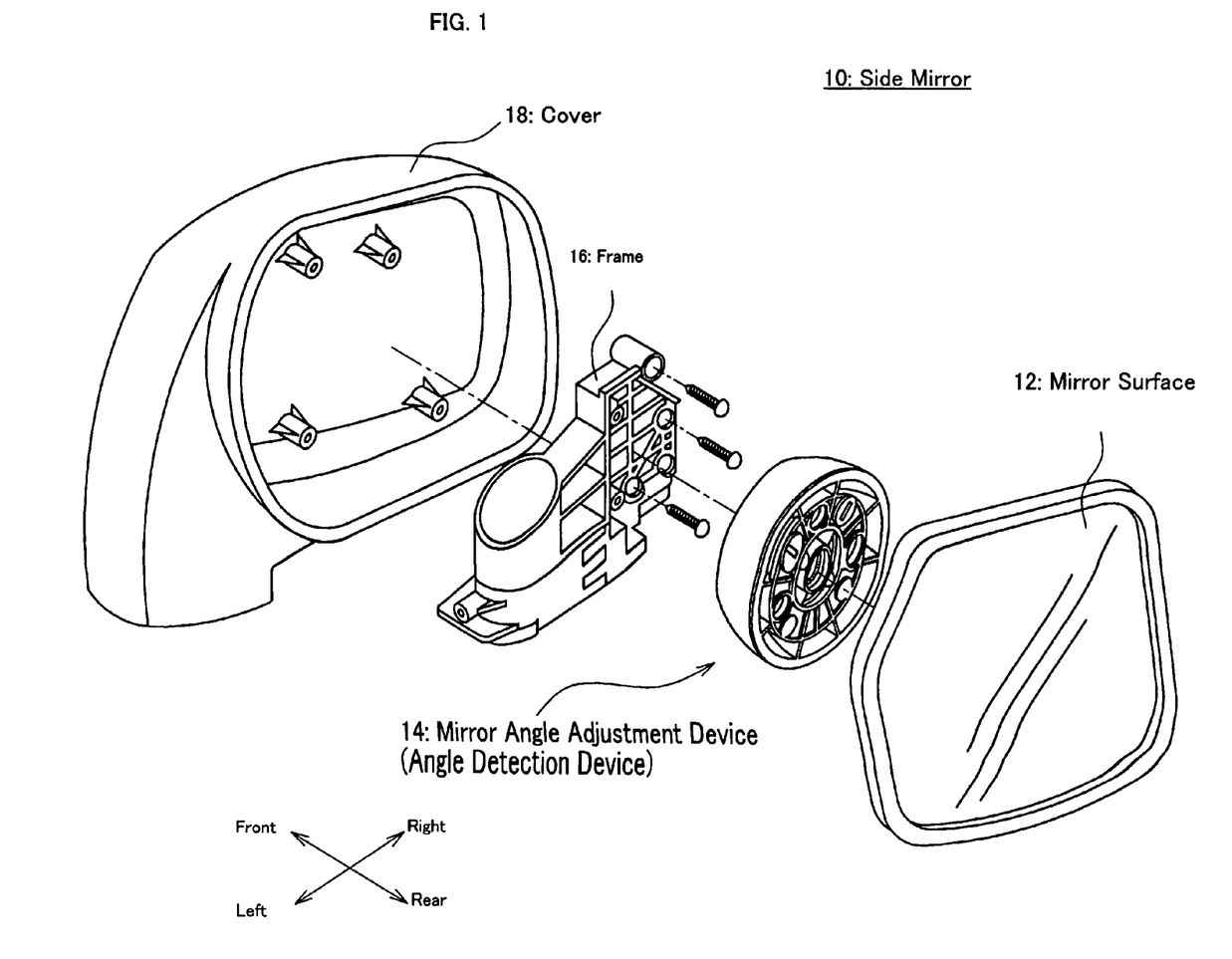
FIG. 1 is an explored perspective view showing one example of the configuration of the side mirror according to one embodiment of the present invention.

FIG. 1 is an explored perspective view showing one example of the configuration of the side mirror according to one embodiment of the present invention. The side mirror 10 is a vehicle exterior mirror and possesses a cover 18, a mirror surface 12, a frame 16, and a mirror angle adjustment device 14.

The cover 18 is a mirror body which covers the outside of the side mirror 10, and accommodates the frame 16 and the mirror angle adjustment device 14. The cover 18 has an opening at the rear side of the vehicle, and holds the mirror surface 12 on the opening in a tilting manner. The mirror surface 12 is fitted to the opening of the cover 18 in such a manner that the reflecting surface thereof is directed toward the rear side of the vehicle.

The frame 18 is a base fixed onto the cover 18, and holds the mirror angle adjustment device 14 in a state directed toward the rear surface of the mirror surface 12. The term "rear surface of the mirror surface 12" intended herein is a surface directed toward the opposite direction of the reflecting surface.

The mirror angle adjustment device 14 is a driving device which tilts the mirror surface. In this embodiment, the mirror angle adjustment device 14 further possesses a function of an angle detection device which detects the tilted angle of the mirror surface 12, and adjusts the tilted angle of the mirror surface 12 by tilting the mirror surface 12 so that the memorized value, which has been previously memorized, is accorded with the detected value of the angle. By such a configuration, the mirror according to this embodiment serves as a mirror (memory mirror), which adjust the tilted angle of the mirror surface to meet the previously memorized view position of the driver.

Figure 2:
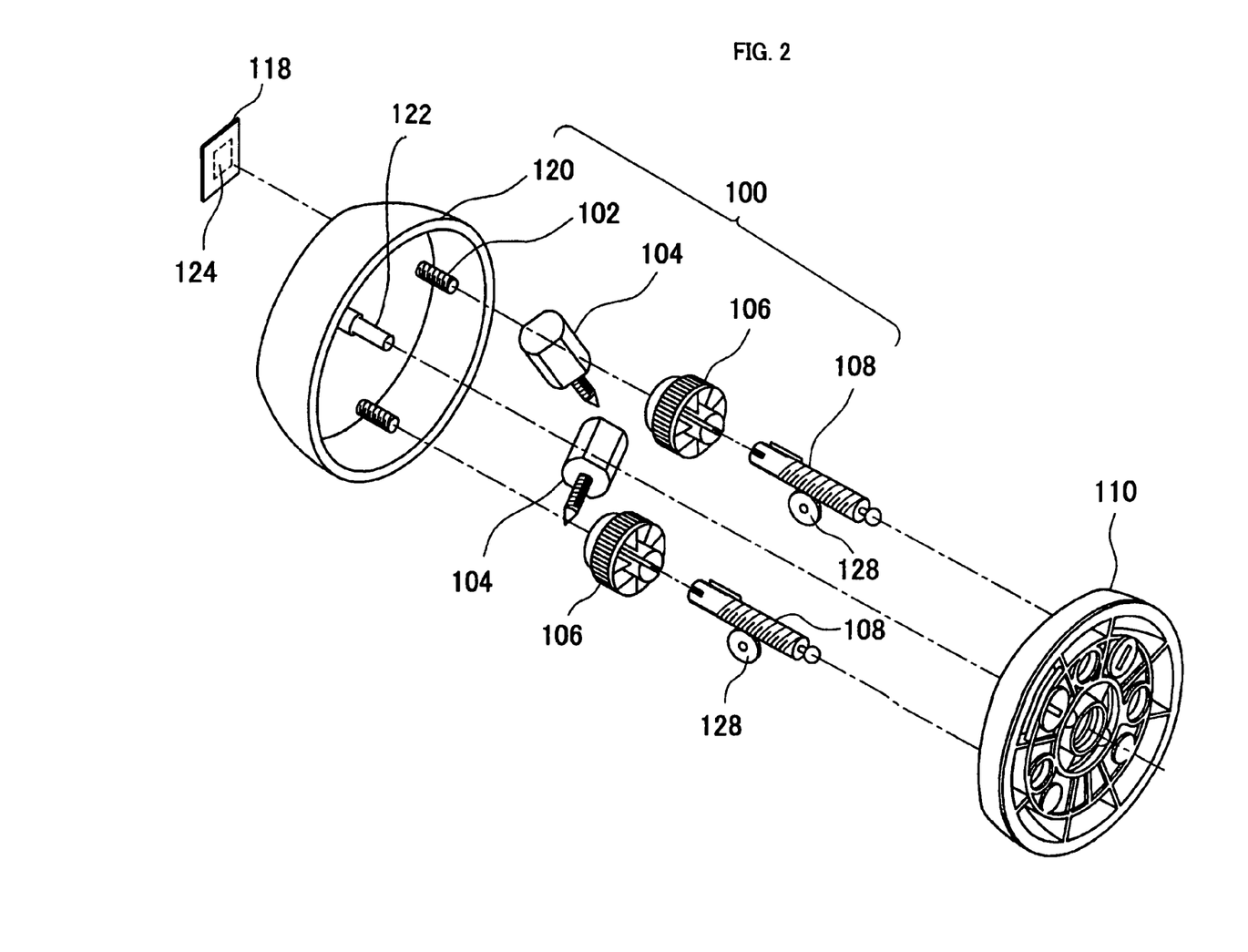
FIG. 2 is an explored perspective view showing a first example of the configuration of the mirror angle adjusting device 14.

FIG. 2 is an explored perspective view showing a first example of the configuration of the mirror angle adjusting device 14. The mirror angle adjustment device 14 possesses a plate pivot 110, an actuator 100, and two rotational variable resistors 128, and a substrate 118.

The plate pivot 110 is a plate member which is tilted by the moving force of the actuator 100, and holds the rear surface of the mirror surface 12 (see FIG. 1) so that the state is kept where it is parallel to the mirror surface 12. According to this configuration, the mirror surface 12 can be tilted interlocking with the plate pivot 110.

The actuator 100 includes a housing 120, two pairs of motors 104 and worm wheels 106, and adjust nuts 108. The housing 120 is provided so as to be facing the mirror surface 12 across the plate pivot 110, and holds the motors 104, worm wheels 106, the adjust nuts 108 and the rotational variable resistors 128 between the actuator 100 and the plate pivot 110.

The housing 120 possesses a center support portion 122 and two male screws projecting toward the plate pivot 110 respectively. The center support portion 122 supports the center portion of the plate pivot 110 so that the plate pivot 110 can be freely tilted around the axis passing through the central portion of the plate pivot 110. These two male screws 102 project toward a point on the rotation axis of the plate pivot 110 in the horizontal direction, and the rotation axis of the plate pivot 110 in the vertical direction, respectively.

The term "the rotation axis of the plate pivot 110 in the horizontal direction" intended herein is a horizontal axis parallel to the mirror surface 12, for example, for tilting the plate pivot 110. The term "the rotation axis of the plate pivot 110 in the vertical direction" intended herein is an axis perpendicular to the mirror surface 12 for example, for tilting the plate pivot 110. The term "the central portion of the plate pivot 110" intended herein is a point of intersection between the rotation axis of the plate pivot 110 in the horizontal direction and the rotation axis of the plate pivot 110 in the vertical direction. The central portion of the plate pivot 110 may be a fulcrum of tilting the plate pivot 110. One motor 104, one worm wheel 104, and one adjust nuts 108 are provided corresponding to two male screw portion 102, respectively.

The motor 104 has a worm gear engaged with the external circumference of the worm wheel 106, and is held by the housing. The worm wheel 106 is in a substantially column shape having gear engaged with the worm gear of the motor 104 formed on the external circumference thereof, and is held by the housing 120 in a rotatable manner. Into the inner circumference of the worm wheel 106 is pierced through the made screw portion 102.

The adjust nut 108 is one example of a slide rod which moves forward and backward relative to the rear surface of the mirror surface 12, to thereby tilt the mirror surface 12. In this embodiment, the adjust nut 108 is inserted into the inner surface of the worm wheel 106 from the opposite side of the male screw portion 102, and is screwed with the male screw portion 102. The adjust nut 108 is held by the worm wheel 106 in such a manner that it is not relatively rotated around the worm wheel, and can be moved toward the axis direction of the worm wheel. The end of the adjust nut 108 far from the male screw portion 102 is engaged with the rear surface of the pivot plate 110. In this embodiment, the side surface of the adjust nut is formed a gear engaged with the rotational variable resistor 110.

In this embodiment, when the motor 104 is rotated, the worm wheel 106 corresponding to the rotated motor 104 is rotated according to the rotation of the rotated motor 104 together with the adjust nut 108 around the male screw portion 102 as a center. According to this rotation, the adjust nut 108 screwed with the male screw portion 102 is guided to the groove of the male screw portion 103 to move toward or backward in the axis direction of the male screw direction.

The pivot plate 110, which is engaged with the adjust nut at the rear surface thereof, is tilted around the rotation axis in the horizontal direction or the rotation axis in the vertical axis as a center depending upon the movement of the adjust nut 108. The plate pivot 110 tilts the mirror surface 12 to be accorded with the tilting of the plate pivot 110 itself. As described above, the actuator 100 tilts the mirror surface 12 around the axis parallel to the mirror surface 12.

The rotational variable resistors 128 are a variable resistor having a rotor for changing the resistance, and are provided to be corresponded with two adjust nuts 108, respectively. The rotor of the rotational variable resistor 128 is engaged with the gear possessed by the side surface of the corresponding adjust nut 108. For this reason, the rotational variable resistor 128 changes the resistance value depending upon the movement of the adjust nut 108. According to such a configuration, the resistance value of the rotational variable resistor 128 can be changed depending on the tilted angle of the mirror surface 12.

The substrate 118 is a substrate having circumference electric circuit packaged thereon. In this embodiment, the signal outputting portion 124 is provided on the substrate. The signal outputting portion 124 outputs a signal to meet the tilted angle of the mirror surface 12 based on the resistance value of the rotational variable resistor 128 to the outside of the side mirror 10 (see FIG. 1). According to this configuration, the tilted angle of the mirror surface 12 can be suitably detected.

Figure 3:
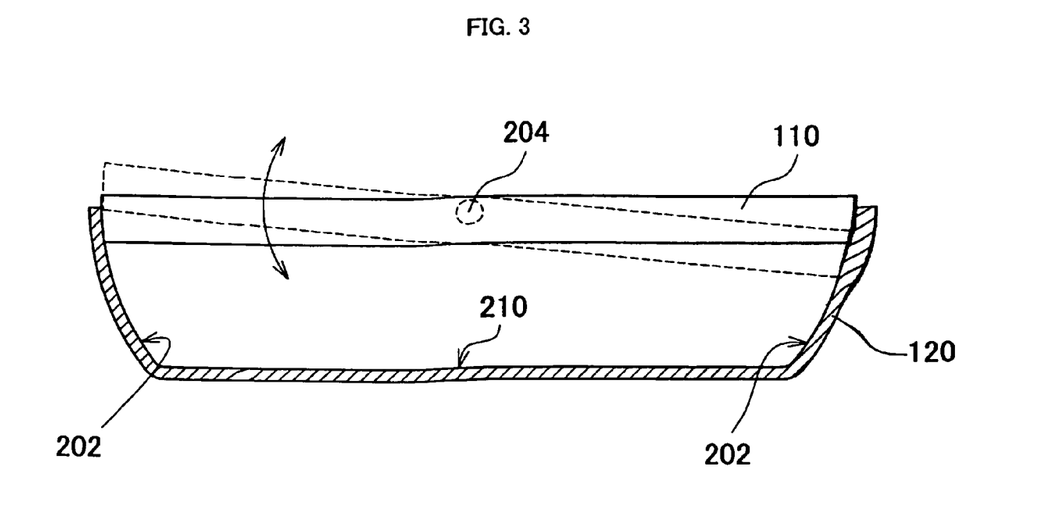
FIG. 3 is a drawing describing the functions of the housing 120.

FIG. 3 is a drawing showing the function of the housing 120 and shows the cross-section of the housing 120 together with the plate pivot 110. In FIG. 3, in order to simplify the explanation, male screw portion 102, the center support portion 122 (see FIG. 2), and the like of the housing 120 are omitted.

In this embodiment, the housing 120 is a bowl shape body which holds the plate pivot at its opening, and covers the rear surface and side surface of the plate pivot 110 so as to face the mirror surface 12 (see FIG. 1) of the plate pivot 110.

The housing 120 has a bottom portion 210 substantially parallel to the plate pivot 110, and a sidewall portion 202 formed extending from the bottom portion 210 so as to cover the sidewall of the plate pivot 110. The side wall portion 202 is formed in a curved from so as to guide the side wall of the tilting plate pivot 110. The sidewall portion 220 may be a spherical wall surface which is curved at a prescribed curvature.

According to this configuration, the plate pivot 110 can be stably tilted. The plate pivot 110 is tilted around the axis 204, which being guided by the sidewall portion 202 of the housing 120.

By setting the bottom surface portion 210 at substantially parallel to the plate pivot 110, the size of the housing can be made small. According to this embodiment, the rotational variable resistor 128 (see FIG. 2) may be used to provide the variable resistor for detecting the tilting angle of the mirror surface 12 within the small-sized housing 120 in a suitable manner.

Figure 4A:
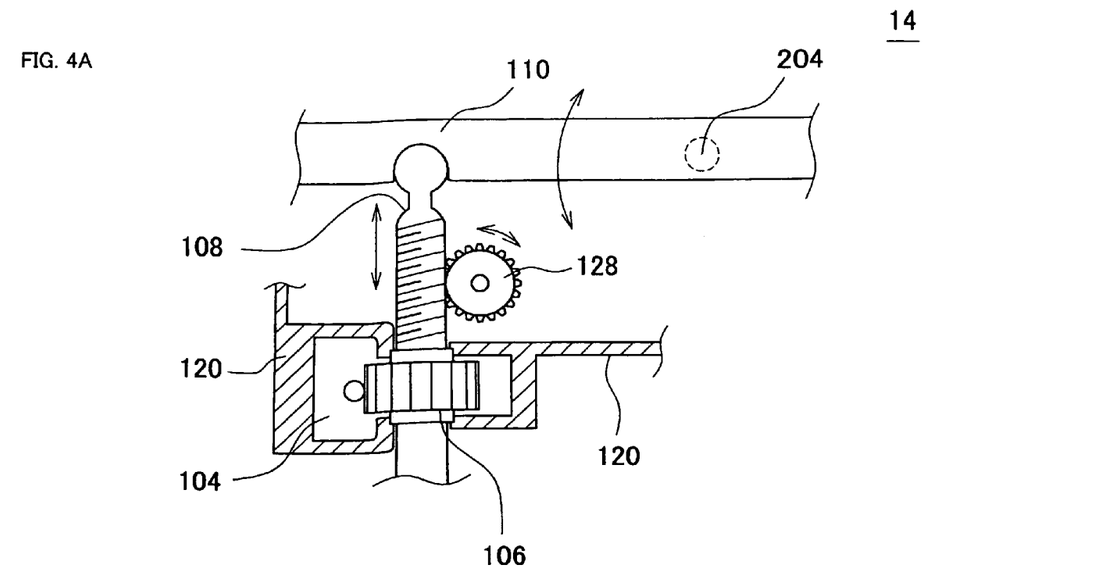
FIG. 4A shows the movement of the rotational variable resistor 128 according to the movement of the adjust nut 108.

FIG. 4 is a drawing showing the rotational variable resistor 128 in detail. FIG. 4A shows the movement of the rotational variable resistor 128 according to the movement of the adjust nut 108. As described by using FIG. 2, adjust nut 108 moves forward or backward according to the rotation of the motor 104 and the worm wheel 106 to tilt the plate pivot 110. The rotor of the rotational variable resistor 128 is engaged with the gear of the adjust nut 108.

For this reason, when the motor 104 is rotated for tiling the mirror surface (see FIG. 1), the rotor of the rotational variable resistor 128 is rotated according to the movement of the adjust nut 108. Then depending upon the rotation amount of the rotor, the rotational variable resistor 128 changes its resistance value. For this reason, the rotational variable resistor 128 changes the resistance value depending on the tilted angle of the mirror surface 12. In this embodiment, the gear of the side surface of the adjust nut 108 is formed in to a screw form. The motor 104 and the worm wheel 106 is fixed into the housing while being water-proof sealed.

Figure 4B:
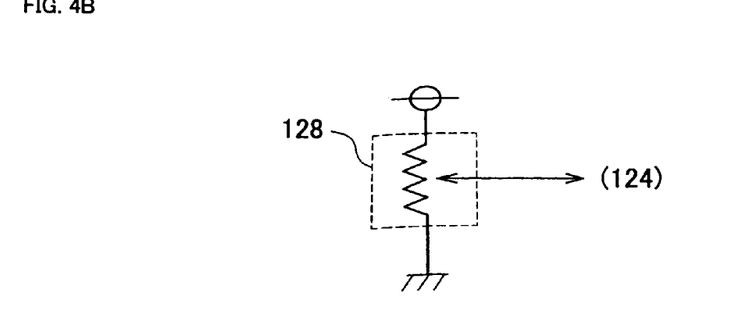
FIG. 4B shows a relation between the signal outputting portion 124 and the rotational variable resistor 128.
Figure 4C:
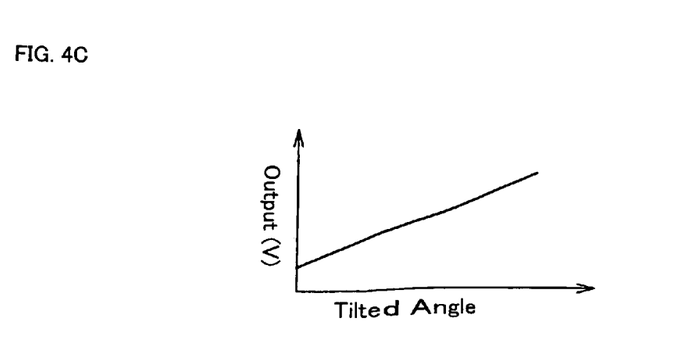
FIG. 4C shows the outputting characteristic of the rotational variable resistor 128.

FIG. 4B shows a relation between the signal outputting portion 124 and the rotational variable resistor 128, and FIG. 4C shows the outputting characteristic of the rotational variable resistor 128. In this embodiment, the rotational variable resistor 128 is connected between a prescribed power source potential and a prescribed ground potential, the voltage corresponding the resistance value changing depending upon the tilted angle of the mirror surface 12 is supplied to the signal outputting portion 124. According to this configuration, a voltage in proportion to the tilted angle of the mirror surface 12 can be supplied to the rotational variable resistor 128. The signal outputting portion 124 outputs the signal according to the tilted angle of the mirror surface 12 based on the voltage. According to this embodiment, the tilted angle of the mirror surface 12 can be suitably detected.

Figure 5:
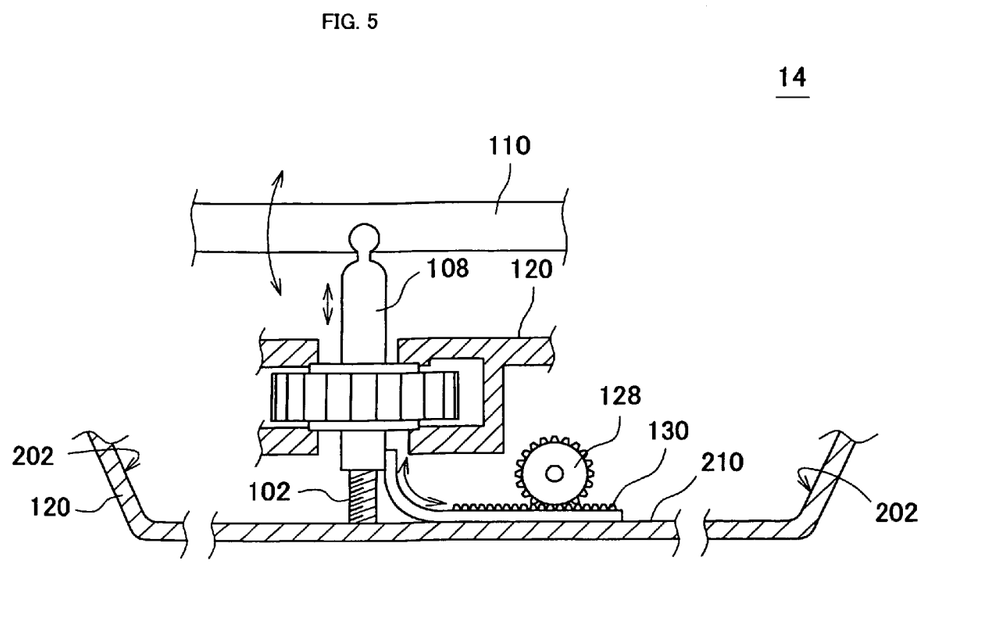
FIG. 5 is a drawing showing a second example of the configuration of the mirror angle adjusting device 14.

FIG. 5 shows the second embodiment of the mirror angle adjustment device. The constitutions having the functions in FIG. 5 same as or similar to those shown in those of FIG. 2 to FIG. 5 are assigned to the same symbols and the description thereof will be omitted. The mirror angle adjustment device 14 of this embodiment further possesses, for example, the motor 104 of the actuator 100 (see FIG. 2), the substrate 118 (see FIG. 2) and the like.

The mirror angle adjustment device 14 of this embodiment further possesses a belt 130 which moves according to the movement of the adjust nut 108. The belt 130 is made of a flexible material, and has a gear to be engaged with the rotor of the rotational variable resistor 128 formed thereon.

One end of the belt 130 is fixed on the adjust nut 108, and the other end thereof is held on the bottom portion 210 of the housing 120 in a movable manner. The bottom portion 210 holds the belt 130 in such a manner that it can be moved along the bottom surface 210. The rotational variable resistor 128 is provided on the bottom portion 210 in such a manner that the belt 130 is sandwiched between the rotor and the bottom portion 210. Also, in this configuration, the rotational variable resistor 128 can be suitably provided within the small sized housing 120.

Also, in this configuration, when the adjust nut 108 moves toward or backward in order to change the tilted angle of the mirror surface 12 (see FIG. 1), the belt 130 moves on the bottom portion 210 according to this movement. The rotor of the rotational variable resistor 128 is rotated according to the movement of the belt 130. For this reason, also in this configuration, the resistance value of the rotational variable resistor 128 can be changed according to the tilted angle of the mirror surface. Also, the tilted angle of the mirror surface 12 can be suitably detected.

The present invention can be suitably used, for example, as a vehicle exterior mirror.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A vehicle mirror comprising:
    a mirror surface;
    a plate pivot which tilts the mirror surface by tilting the plate pivot itself, which is a plate member that can be tilted around an axis parallel to said mirror surface, and which is provided on the rear surface of the mirror surface;
    a housing which covers said plate pivot facing to the rear surface of the mirror surface across said plate pivot, which possesses a bottom portion substantially parallel to said plate pivot, and a curved side wall which is brought into contact with the side surface of said plate pivot to guide said side surface;
    a slide rod which is provided between said housing and said plate pivot, and which moves toward or backward to the rear surface of said plate pivot to tilt said plate pivot;
    a belt made of a flexible material which moves along the movement of said slide rod;
    a rotational variable resistor which is provided between said housing and said plate pivot, and whose resistance value is varied depending on the rotation amount of a rotor that rotates according to the movement of said belt; and
    a signal outputting portion, which outputs a signal corresponding to the tilted angle of the mirror surface depending upon the resistance value of said rotational variable resistor.

2. The mirror according to claim 1, wherein said bottom portion of the housing holds at least part of the belt in the manner that the belt can be moved along said bottom portion.

3. An angle detection device for detecting tilted angle of the mirror surface of a vehicle mirror comprising:
    a plate pivot which tilts the mirror surface by tilting the plate pivot itself, which is a plate member that can be tilted around an axis parallel to said mirror surface, and which is provided on the rear surface of the mirror surface;
    an actuator which tilts said plate pivot around said axis as a center to tilt said mirror surface;
    a housing which covers said plate pivot facing to the rear surface of the mirror surface across said plate pivot, which possesses a bottom portion substantially parallel to said plate pivot, and a curved side wall which is brought into contact with the side surface of said plate pivot to guide said side surface;
    a slide rod which is provided between said housing and said plate pivot, and which moves toward or backward to the rear surface of said plate pivot to tilt said plate pivot;
    a belt made of a flexible material which moves along the movement of said slide rod;
    a rotational variable resistor which is provided between said housing and said plate pivot, and whose resistance value is varied depending on the rotation amount of a rotor that rotates according to the movement of said belt; and
    a signal outputting portion, which outputs a signal corresponding to the tilted angle of the mirror surface depending upon the resistance value of said rotational variable resistor.

* * * * *